April 23, 1929.  J. P. DALY  1,710,298
INTERMITTENTLY ACTUATED MECHANISM
Filed Nov. 5, 1924   2 Sheets-Sheet 2
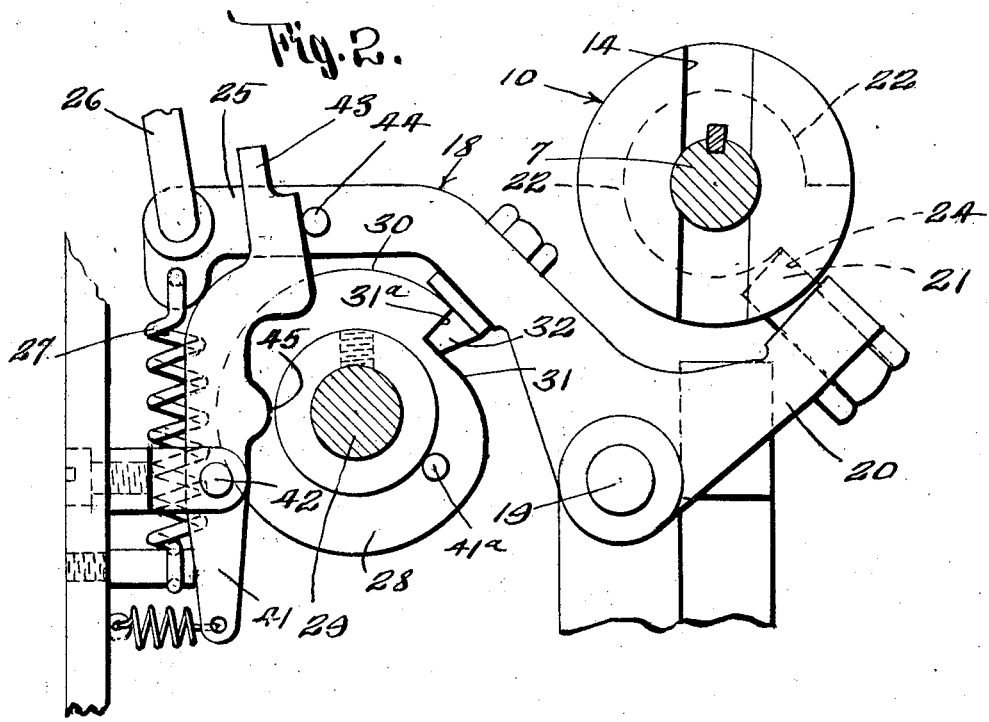
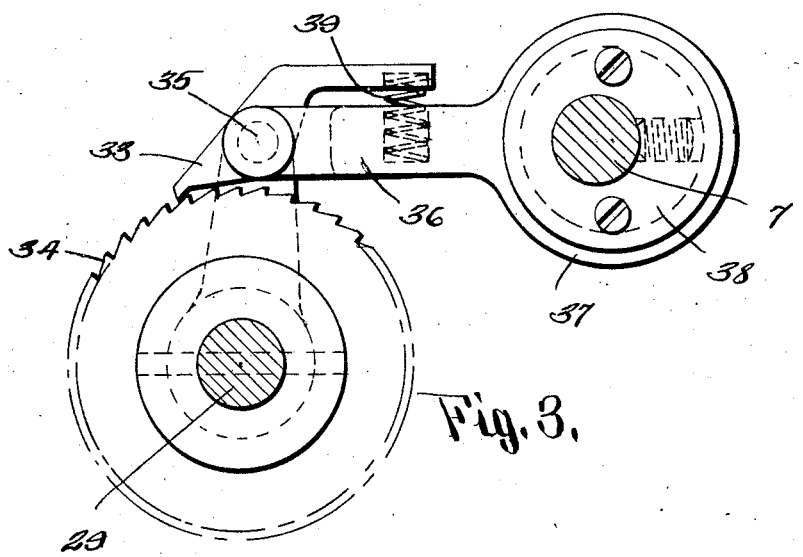
INVENTOR.
Joseph P. Daly.
BY
Parsons & Brodell.
ATTORNEYS.

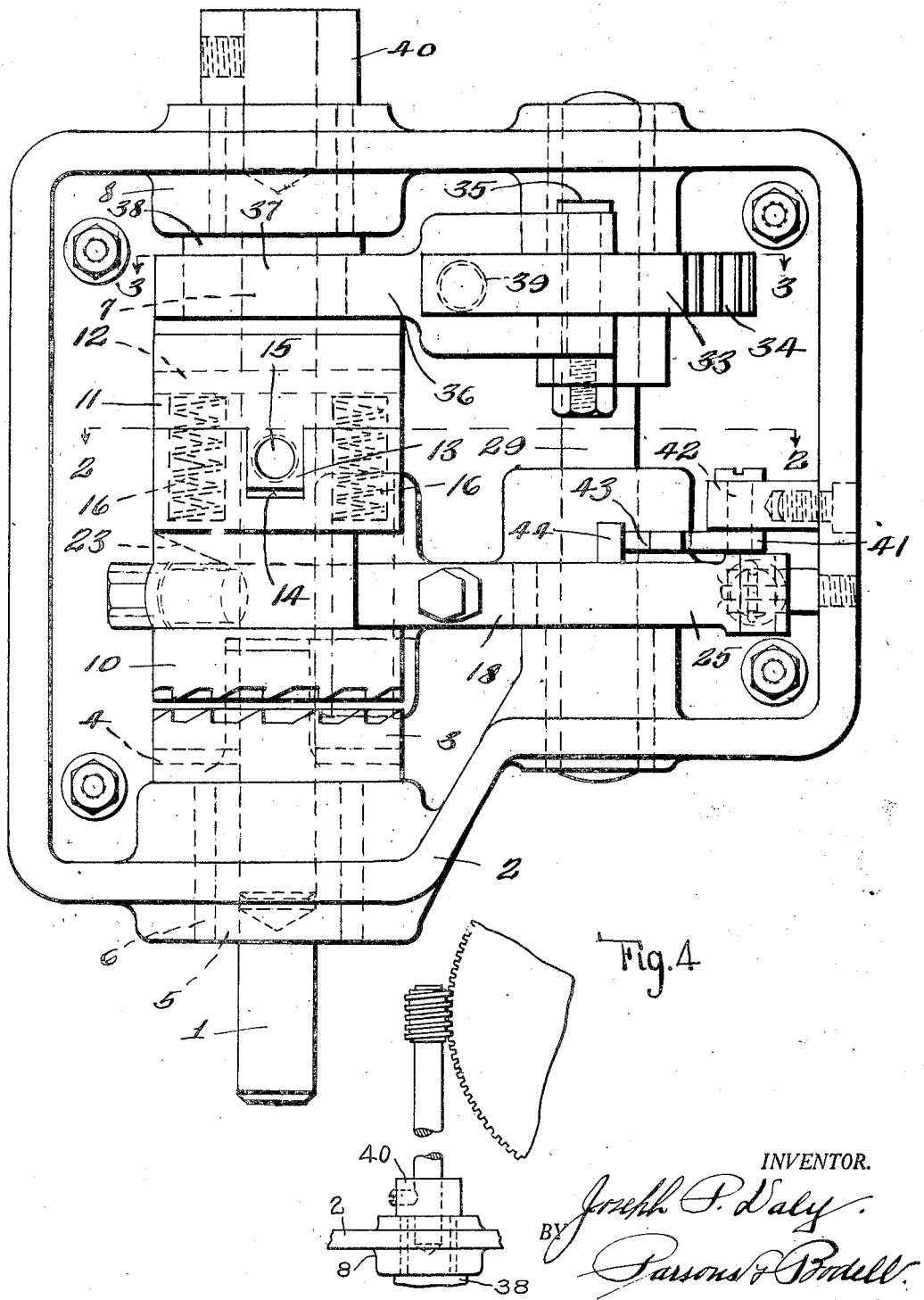

Patented Apr. 23, 1929.

1,710,298

UNITED STATES PATENT OFFICE.

JOSEPH P. DALY, OF SYRACUSE, NEW YORK, ASSIGNOR, BY MESNE ASSIGNMENTS, TO THE PROSPERITY COMPANY, INC., OF SYRACUSE, NEW YORK, A CORPORATION OF NEW YORK.

INTERMITTENTLY-ACTUATED MECHANISM.

Application filed November 5, 1924. Serial No. 747,989.

This invention relates generally to intermittently actuated mechanisms and has for its object a particularly simple and efficient automatically controlled means for connecting and disconnecting an intermittently actuated mechanism from a constantly running driver or driver that is running at the time the connection and disconnection is made, which means is particularly simple in construction and highly efficient and durable in use.

The invention consists in the novel features and in the combinations and constructions hereinafter set forth and claimed.

This mechanism is particularly designed for use in connection with electric motors and it operates to effect the periodic actuation of the mechanism actuated by the motor.

It is particularly adapted to effect the opening and the closing of garment and laundry presses, the prime mover of which is an electric motor. During the opening or the closing movement of the press, one of the motion transmitting parts makes a periodic movement as a half revolution and this part is driven through reduction gearing from the electric motor making in the neighborhood of 1750 R. P. M. This means disconnects and connects the motor shaft and the mechanism making a periodic movement as a half revolution during each operation.

In describing this invention, reference is had to the accompanying drawings in which like characters designate corresponding parts in all the views.

Figure 1 is a plan view of this controller mechanism.

Figure 2 is a section looking downwardly taken on line 2—2, Figure 1.

Figure 3 is a section partly in elevation taken on line 3—3, looking downwardly.

Figure 4 is a detail view illustrating one form of driven mechanism as a worm and worm gearing used in connection with this controller mechanism.

This intermittently actuated mechanism comprises, generally, a constantly running driving element, a driven element, clutch sections rotatable with the driving and driven elements and being normally out of engagement with each other, one clutch section being shiftable into and out of engagement with the other, a spring tending to press the shiftable section in one direction, an intermittently actuated member for shifting the clutch section in the opposite direction against the action of the spring and mechanism for operating said member including manual or operator operated means for initially operating said member to bring about the shifting of the clutch section in one direction and automatic means actuated from the driven element to control the shifting of the clutch section in the opposite direction.

1 designates the driving element which is usually a shaft, this shaft being actuated by an electric motor or coupled directly to the rotor of the motor, the shaft being mounted in suitable bearings in the casing 2. By constantly running driver is meant a driver that is running at the time the clutch section is shifted.

3 is a clutch section mounted on the shaft 1 to rotate therewith and as here shown, is keyed to the shaft 1 by a key 4 and has a hub 5 surrounding the shaft in the bearing opening in the case 2 for the shaft, a suitable bushing 6 surrounding the hub.

7 is the driven shaft or element journalled in a suitable bearing 8 in the case and arranged in axial alinement with the shaft 1.

10 is the clutch section mounted on and rotatable with the shaft 7 and normally disengaged or spaced apart from the clutch section 3, one of these sections 3, 10 being shiftable into and out of engagement with the other and preferably the driven clutch section 10 is shiftable.

As here illustrated, a collar 11 is mounted on the shaft 7 to rotate therewith, it being keyed to the shaft as by a key 12, this collar having one or more projecting shoulders 13 extending into complemental notches 14 in the abutting end of the clutch section 10. The collar 11 is additionally secured to the shaft 7 by a set screw 15 extending through one of the shoulders 13.

The clutch section 10 and the collar 11 are formed in their opposing ends with recesses for receiving springs 16 which tend to thrust the clutch section 10 into engagement with the clutch section 3 so that in a preferable form of my invention, the shiftable clutch section is shifted to its "in" position by spring means, and means is provided for positively shifting it to its "out" position and holding it in its "out" position during each cycle of movement. This positive shifting means as here shown includes a member as a lever 18 pivoted at 19 between its ends to the casing and having one arm 20 thereof formed with a follower or roller 21 arranged in a cam groove 22 extending in a circumferential direction around the shiftable clutch section 10, this cam groove having a lift portion 23 on its side wall and a stop shoulder 24 at the end of the lift portion. The other arm 25 of the lever is actuated from the driven element to hold the follower out of the cam groove 22 and is initially manually shifted by means as a link 26 connected to the free end of the arm 25 and to a suitable handle not shown. A suitable spring 27 is connected to the arm 25 and tends to move the lever 18 in such direction as to move the follower 21 into the cam groove 22, and the manual means operates against this spring 27.

The means controlled by the driven element for holding the lever 18 in its manually operated position until the mechanism driven by the shaft 7 has made a predetermined movement as a half revolution comprising a cam 28 mounted on a shaft 29 journalled in the case 2, this cam being in the general form of a scroll having a high portion 30 and a lift portion 31 and also a shoulder 31ᵃ at the end of the drop portion. This cam 28 coacts with a follower 32 on the arm 25 of the lever 18.

The cam is actuated or the shaft 29 is actuated from the driven element through mechanism which makes one step during each rotation of the driven element and this comprises a reciprocating pawl 33 actuated from the driven element 7 and coacting with a ratchet wheel 34 mounted on the shaft 29.

As here illustrated, the pawl is pivoted at 35 to an arm 36 projecting outwardly from a strap 37 surrounding an eccentric disk 38 mounted on the driven shaft 7. The tail of the pawl is acted upon by a suitable spring 39 to permit ratcheting thereof during each revolution of the shaft 7. The pawl actuates the ratchet wheel one step and in the illustrated embodiment of my invention, the ratchet wheel 34 has forty-one teeth, so that the ratchet wheel and the cam make one revolution during forty-one revolutions of the drive shaft 1 and driven shaft 2.

When embodied in a pressing machine, the driven shaft 7 is connected by a suitable coupling 40 to a worm which meshes with the worm gear and the ratio between the worm and the worm gear is such that the worm gear makes one revolution during eighty-two revolutions of the worm or the worm gear makes a half revolution during forty-one revolutions of the worm and the driving and driven shafts 1, 7 and hence the worm gear through this control mechanism makes a half revolution during each rotation of the cam 28 or each operation of the shiftable clutch section 10.

The lever 18 as before stated is initially manually operated to move the follower 21 out of the cam groove 22 of the shiftable clutch section 10, and means is provided for momentarily holding the lever 18 in its manually operated position, this means being here shown as a spring pressed latch 41 pivoted at 42 and having a latching end 43 arranged to hook under a shoulder or pin 44 on the lever 18. The latch is tripped to release it after the cam has made at least a sufficient movement to move the high point of the cam 42 under the follower 32 by a pin 41ᵃ on the cam coming in contact with a rounding projection 45 on the latch.

In operation, the operator applies through suitable handle mechanism connected to the lever 26 a sufficient force to lift the arm 25 of the lever to move the follower 21 out of the cam groove 22 of the shiftable clutch section 10 and hence permit the clutch sectin 10 to shift into interlocking engagement with the driving clutch section 4, the latch 41 hooking under the pin 44 on the lever arm 25 and momentarily holding the lever in its manually operated position.

As soon as the clutch section 10 engages the clutch section 3, the driven shaft 7 is actuated at the speed of the driving shaft, that is, approximately 1750 revolutions per minute.

As the driven shaft 7 rotates, it reciprocates the pawl 33 once during each rotation and hence rotates the ratchet wheel 34 one step during each rotation and also the cam 28 so that after the ratchet wheel has been actuated forty-one steps, that is, after the driving and driven shafts have made forty-one revolutions, the cam 28 will have made one revolution and the parts again will have come into their position shown in Figure 2.

Owing to the periphery of the cam 28 and especially the low point 31 thereof, the follower 32 enters into the low portion of the cam 28 about the time the follower 21 will drop into the entrance of the lift portion 23 of the cam groove 22 so that during the extreme end of the rotation of the clutch section 10, it will be shifted outwardly by the fact that the follower 21 is being acting on by the lift portion 23 of the cam groove 22. After the cam 28 has made about a quarter revolution, the pin 41ᵃ trips the latch 41 so that now the lever 21 is held in its operated position by the follower 32 riding on the surface of the cam 28 and when this follower 32 reaches the low point of the cam 28, the spring 27 is free to react to carry the follower 21 into the cam groove 22.

Owing to this construction, the worm gear driven by the worm gear connected to the driven shaft 7 and hence the mechanism actuated by the worm gear will make a half revolution during each shifting in and out of the clutch 10.

What I claim is:

1. In an intermittently actuated mechanism, the combination of a driver having a clutch section associated therewith, an intermittently actuated driven element having complemental clutch sections for coacting with the former clutch section and normally disengaged therefrom, one of said sections being shiftable into and out of engagement with the other, a spring acting on the shiftable clutch section to shift it in one direction, means including a movable member coacting wih the shiftable clutch section to shift it in the other direction, said member being shiftable into and out of operative engagement with the shiftable section, and being normally in engagement therewith, manual means for shifting said member to move it out of its normal position, a cam coacting with said member for shifting the same into its normal position, and motion transmitting means actuated by the driven element for actuating the cam, the motion transmitting means comprising a reduction gearing whereby the driven element makes a plurality of revolutions with the driving element for each revolution of the cam, and a latch for holding the cam in its manually operated position, the cam having means for tripping the latch.

2. In an intermittently actuated mechanism, the combination of a driver, having a clutch section associated therewith, an intermittently actuated driven element, having a clutch section coacting with the former clutch section and normally out of engagement therewith, one of said clutch sections being shiftable into and out of engagement with the other, a spring for shifting the shiftable section into engagement with the other clutch section, the shiftable section being formed with a circumferentially extending cam groove, a lever having a follower normally located in the groove, a spring acting on the lever to actuate it in one direction to shift the follower into the groove, said lever being manually operable in the other direction, a cam coacting with the lever to hold the lever in its manually operated position, and control the movement of the lever to carry the follower into the groove, a shaft on which the cam is mounted, a ratchet wheel mounted on said shaft, an eccentric associated with the driven element, a pawl actuated by the eccentric and coacting with the ratchet wheel, a latch for normally holding the lever in its manually operated position, and means on the cam for tripping the latch.

In testimony whereof, I have hereunto signed my name, at Syracuse, in the county of Onondaga, and in the State of New York, this 11th day of October, 1924.

JOSEPH P. DALY.